(12) United States Patent
Cummings (10) Patent No.: US 7,640,604 B2
(45) Date of Patent: Jan. 5, 2010

(54) WASTE REMOVAL SYSTEM (75) Inventor: Stephen John Cummings, Newport (AU)

(73) Assignee: Caroma Industries Limited, Brisbane, Queensland (AU)

( * ) Notice: Subject to any disclaimer, the term of this patent is extended or adjusted under 35 U.S.C. 154(b) by 399 days.

(21) Appl. No.: 10/486,566

(22) PCT Filed: Jul. 29, 2002

(86) PCT No.: PCT/AU02/01005

§ 371 (c)(1),
(2), (4) Date: Aug. 31, 2004

(87) PCT Pub. No.: WO03/014483

PCT Pub. Date: Feb. 20, 2003

(65) Prior Publication Data

US 2005/0000007 A1 Jan. 6, 2005

(30) Foreign Application Priority Data

Aug. 10, 2001 (AU) ........................... PR6958

(51) Int. Cl.
*E03D 11/02* (2006.01)
*E03D 11/18* (2006.01)
(52) U.S. Cl. .......................................... 4/421
(58) Field of Classification Search ............ 4/420, 4/421, 424–425, 428–430, 328

See application file for complete search history.

(56) References Cited

U.S. PATENT DOCUMENTS

| 524,246 | A | * | 8/1894 | Garland | 4/420 |
| 860,197 | A | * | 7/1907 | Ellis | 4/215 |
| 3,224,013 | A | * | 12/1965 | Tubbs | 4/425 |
| 5,218,726 | A | | 6/1993 | Jaeckels et al. | |
| 5,283,913 | A | | 2/1994 | Jaeckels | |
| 5,497,515 | A | | 3/1996 | Mohrman | |
| 5,651,148 | A | * | 7/1997 | Bayot | 4/421 |
| 5,918,325 | A | | 7/1999 | Arita et al. | |
| 5,983,413 | A | | 11/1999 | Hayashi et al. | |

FOREIGN PATENT DOCUMENTS

| DE | 200 20 584 | 3/2001 |
| EP | 0 741 210 | 11/1996 |
| GB | 184350 | 7/1921 |
| GB | 397066 | 3/1933 |
| GB | 424903 | 10/1933 |
| GB | 450889 | 3/1935 |
| GB | 2015917 A | 3/1979 |
| JP | 90-08237 | 7/1990 |
| JP | 7-310352 | 11/1995 |

(Continued)

Primary Examiner—Huyen Le
(74) Attorney, Agent, or Firm—Merchant & Gould P.C.

(57) ABSTRACT

A waste removal system that includes a toilet pan (28) for a ultra-low flushing volume toilet (20). The pan (28) includes a rearward end (28a) adapted for positioning substantially adjacent a cistern (22) and a frontward end (28b) adapted for positioning substantially remote the cistern (22). The pan (28) also includes a flushing water outlet having a primary outlet nozzle arrangement (42) disposed substantially adjacent the pan frontward end (28b) and adapted to direct flushing water (62) downwards and towards the pan rearward end (28a). The system also includes a related flushing method and drainline (90).

6 Claims, 10 Drawing Sheets

FOREIGN PATENT DOCUMENTS

| | | |
|---|---|---|
| JP | 7-310354 | 11/1995 |
| JP | 8-270051 | 10/1996 |
| JP | 9-125502 | 5/1997 |
| JP | 9-1191165 | 5/1997 |
| JP | 10-195961 | 7/1998 |
| WO | WO 90/08237 | 7/1990 |

* cited by examiner

WASTE REMOVAL SYSTEM

FIELD OF THE INVENTION

The present invention relates generally to a waste removal system and more particularly to a ultra-low flushing volume toilet and a related toilet pan, flushing method and drainline.

The expression "ultra-low flushing volume" is herein defined as having nominal full and reduced flush volumes of about 3 liters and 2 liters respectively.

BACKGROUND OF THE INVENTION

The design of water closets (WCs) in Australia has been greatly influenced by the need to minimise water consumption and maintain an adequate sanitation system to safe guard and maintain a high level of public health.

Since 1982 reductions in Australian WC flushing volume have lead to a major lowering of the average daily WC water consumption per person from 55 liters to 18 liters. A major contribution to this reduction was the development of the two button, dual flush WC having 6/3 liter reduced flush technology which gave the user the choice of applying either a 6 liter full flush or a 3 liter reduced flush option to operate the WC.

OBJECT OF THE INVENTION

It is an object of the present invention to provide a toilet and related componentary that can operate directly into a sewer with a ultra-low flushing volume.

SUMMARY OF THE INVENTION

Accordingly, in a first aspect, the present invention provides a toilet pan for a ultra-low flushing volume toilet, the pan including:

a rearward end adapted for positioning substantially adjacent a cistern;

a frontward end adapted for positioning substantially remote the cistern; and a flushing water outlet having a primary outlet nozzle arrangement disposed substantially adjacent the pan frontward end and adapted to direct flushing water downwards and towards the pan rearward end.

The pan preferably also has a S-bend outlet trap with a pan end and sewer end and the primary outlet nozzle arrangement is also adapted to direct flushing water towards and/or into the S-bend pan end.

The S-bend pan end includes a substantially straight pipe section and the primary outlet nozzle arrangement is also adapted to direct flushing water substantially parallel to the longitudinal axis of the pipe section.

A majority of the flushing water is preferably directed to the primary outlet nozzle arrangement.

The primary outlet nozzle arrangement preferably includes a plurality of outlet nozzles.

The pan preferably also has a secondary outlet nozzle arrangement, most preferably in the form of a single nozzle, disposed substantially adjacent the pan rearward end and adapted to direct a minority of the flushing water substantially downwards.

The pan preferably also has tertiary outlet nozzle arrangements, most preferably in the form of holes, disposed along the sides of the pan and adapted to direct a minority of the flushing water substantially downwards.

The pan preferably includes a rear wall leading to the S-bend and the secondary outlet nozzle arrangement is adapted to direct flushing water downwards along the rear wall.

The minority of the flushing water is preferably directed to the secondary outlet nozzle arrangement.

The pan preferably includes a manifold adapted for fluid communication with a flushing outlet of the cistern and the primary or the primary and secondary outlet nozzle arrangements. The manifold preferably substantially replicates the shape of upper rim of the pan.

In one form, the manifold is formed separately from the pan and is preferably releasably engageable therewith. In another form, the manifold is formed integrally with the pan. In a further form, the manifold is formed integrally with the toilet seat.

In a second aspect, the present invention provides a method of flushing a toilet pan for a ultra-low flushing volume toilet, the pan having a rearward end adapted for positioning substantially adjacent a cistern and a frontward end adapted for positioning substantially remote the cistern, the method comprising directing a majority of a cistern's flushing water in a concentrated jet from the upper forward end of the pan towards the lower rearward end of the pan in a direction substantially aligned with the frontward-to-rearward centreline of the pan.

The method preferably also comprises directing a minority of a cistern's flushing water from the upper rearward end of the pan along a rear wall of the pan end towards the lower rearward end of the pan.

The method preferably also comprises directing a minority of a cistern's flushing water down the sides of the pan.

The method preferably also comprises inducing a partial syphon action into the waste outlet of the pan by directing the majority of a cistern's flushing water directly into the pan outlet in a direction substantially parallel to the longitudinal axis of the leading section of the pan outlet, whereby the partial syphon action lowers the level of the water in the pan during the commencement of the flush.

In a third aspect, the present invention provides a toilet pan for a ultra-low flushing volume toilet, the pan comprising:

a flushing outlet; and an outlet trap in fluid communication with the flushing outlet, the outlet trap comprising a first downwardly concave lower bend and a second upwardly convex upper bend, wherein the pan cross-sectional shape at an upper level horizontally aligned with the upper surface of the first bend defines a first relatively larger cross-sectional area and the pan's cross-sectional shape at a lower level horizontally aligned with the lower surface of the second bend defines a second relatively substantially smaller cross-sectional area.

Preferably, the first cross-sectional area is approximately double the size of the second cross-sectional area.

The pan preferably has a substantially vertical rear wall section with a lower edge substantially adjacent the first cross-sectional area. The rear wall is preferably upwardly angled from the rear of the pan at about 0 to 10 degrees from horizontal.

The pan preferably has a front wall section between the first and second cross-sectional areas, the front wall section having an upper relatively steeply angled portion, a lower portion substantially parallel to and displaced rearwardly from the upper portion and an intermediate relatively shallowly angled portion therebetween.

The geometric centre of the first cross-sectional area is preferably substantially horizontally aligned with a user's solid drop position. The second cross-sectional area is preferably wholly rearward of the solid drop position.

In a fourth aspect, the present invention provides a drainline for a ultra-low flushing volume toilet, the drainline characterised by a height-to-width ratio between about 1.4:1 to 1.5:1 and an upper radius-to-lower radius ratio of about 3:1.

The drainline in preferably produced from extruded plastics material.

BRIEF DESCRIPTION OF THE DRAWINGS

Preferred embodiments of the invention will now be described, by way of examples only, with reference to the accompanying drawings in which.

DETAILED DESCRIPTION OF THE PREFERRED EMBODIMENTS

Figure 1:
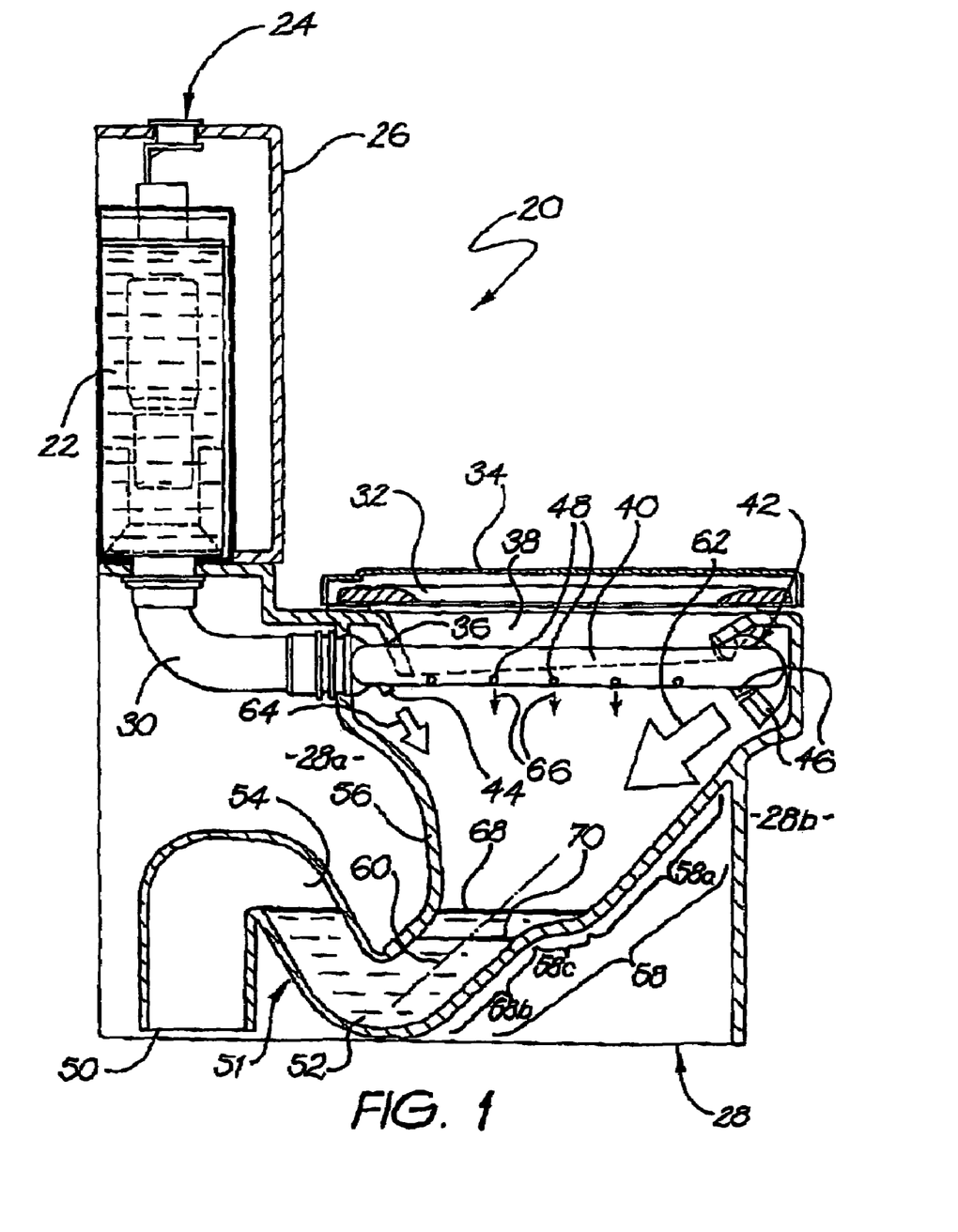
FIG. 1 is a cross sectional side view of a first embodiment of a toilet suite incorporating aspects of the invention.
Figure 2:
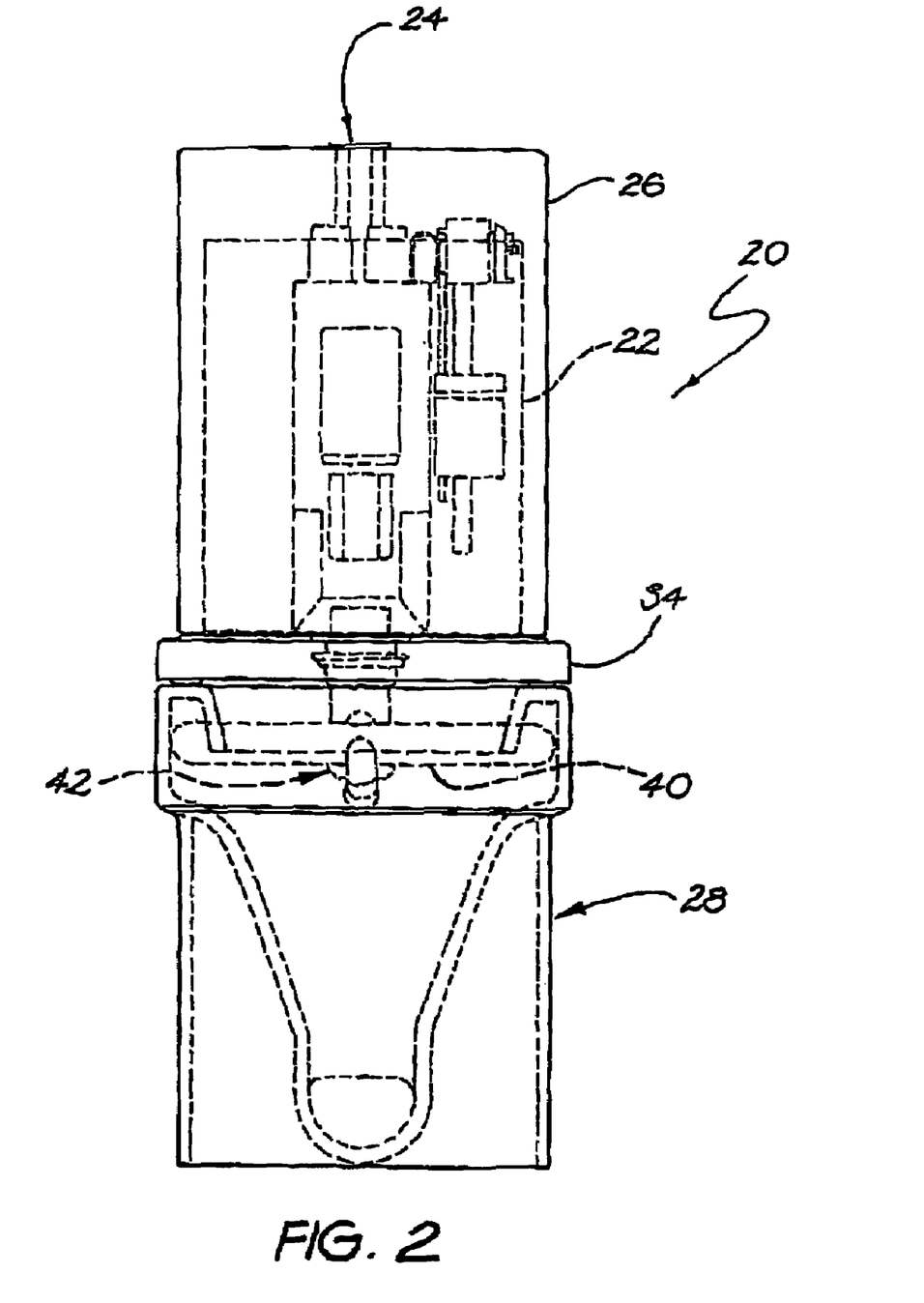
FIG. 2 is a front view of the suite shown in FIG. 1.
Figure 3:
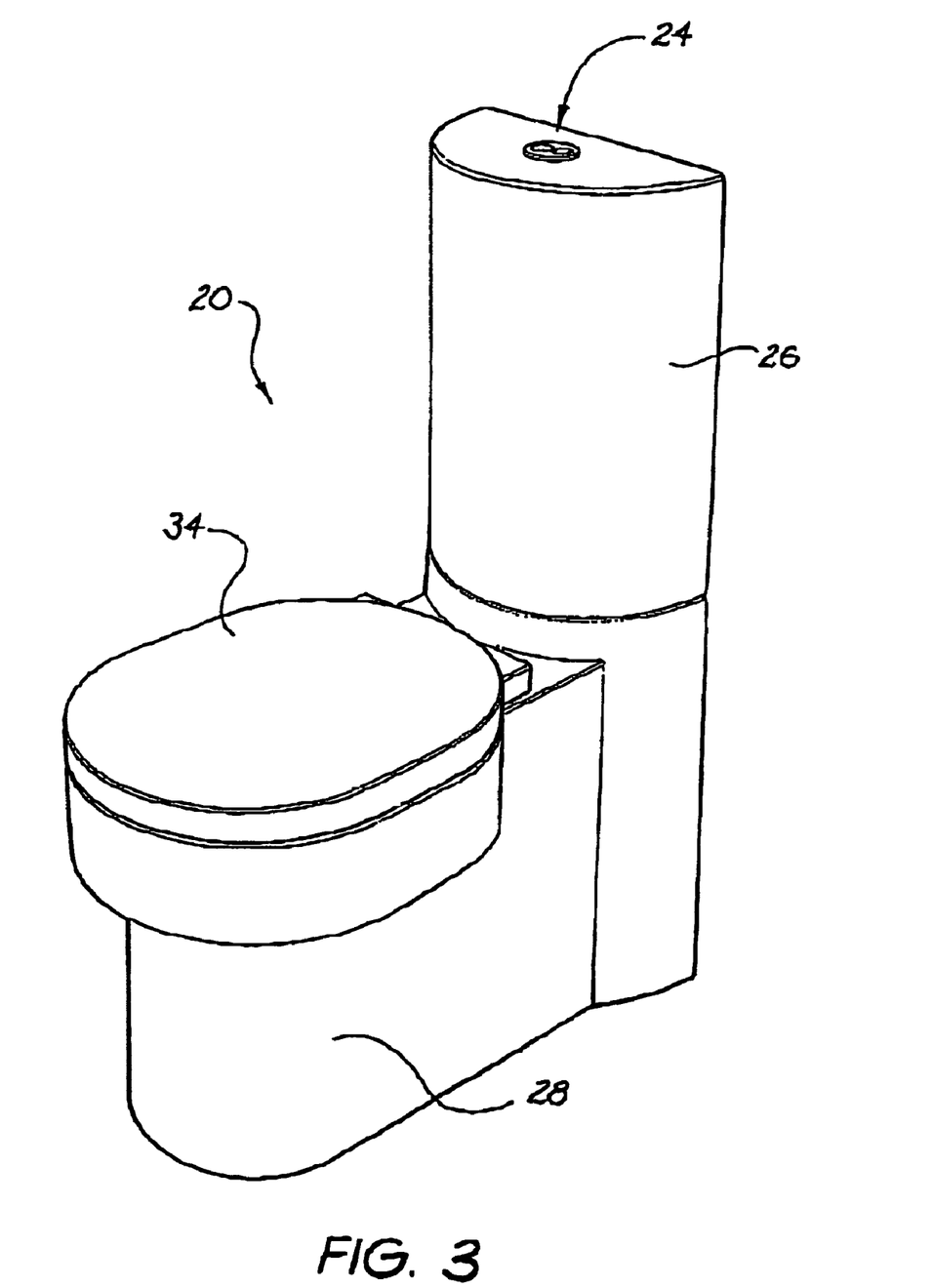
FIG. 3 is a perspective view of the suite shown in FIG. 1.

Referring firstly to FIGS. 1 to 3, there is shown a first embodiment of a toilet suite 20 incorporating aspects of the invention. The suite 20 generally comprises a full and reduced flushing volume cistern 22 (known as a flush tank in the United States) operated by a pair of button actuators 24, which are accessible through the top surface of a cistern body 26. The cistern 22 is placed within the larger cistern body 26 as, due to its ultra-low flushing volume, it would appear out of scale (ie. too small) with the remainder of the toilet suite 20.

The suite 20 also comprises a pan 28 connected to the cistern 22 by a flush pipe 30. A toilet seat 32 and lid 34 are pivotally mounted to the pan 28 by hinges, which are well known. The pan 28 has a rearward end 28*a* and a frontward end 28*b* and a rim 36 about an opening 38.

Figure 7:
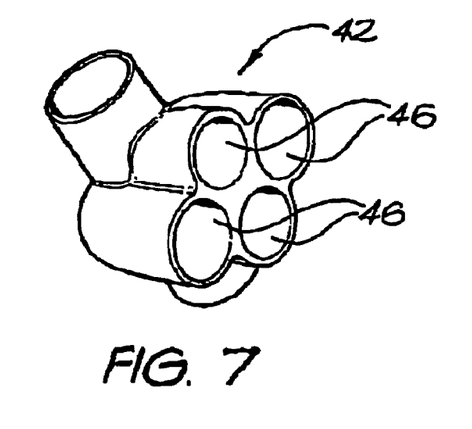
FIGS. 7 to 17 are perspective views of examples of outlet nozzle arrangements.
Figure 8:
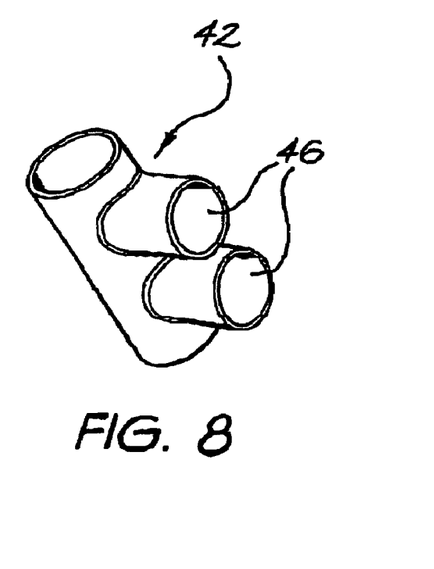
Figure 9:
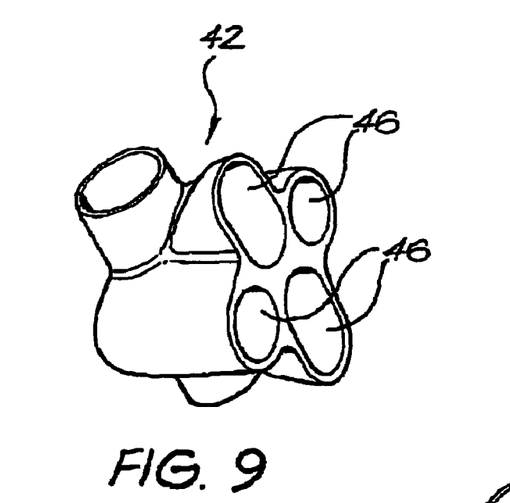
Figure 10:
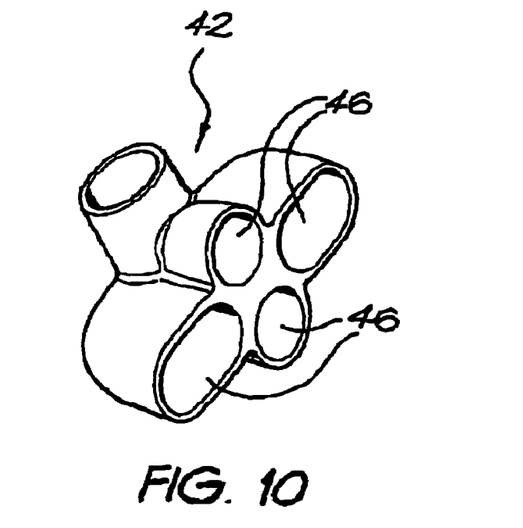
Figure 11:
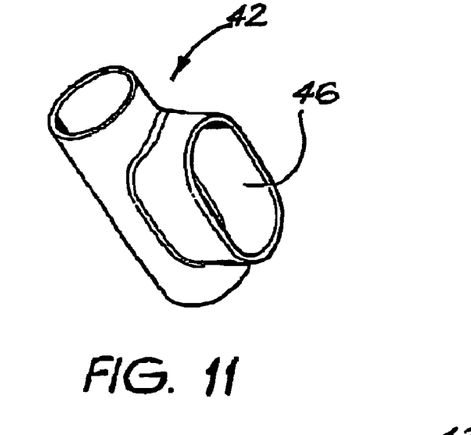
Figure 12:
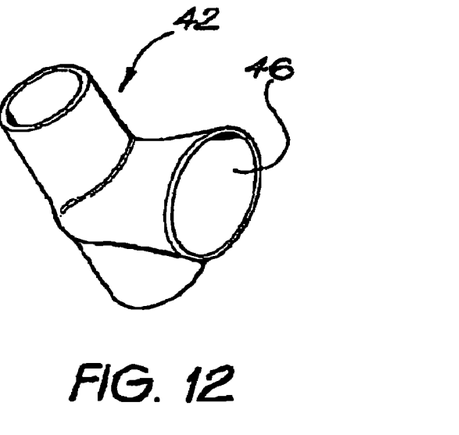
Figure 13:
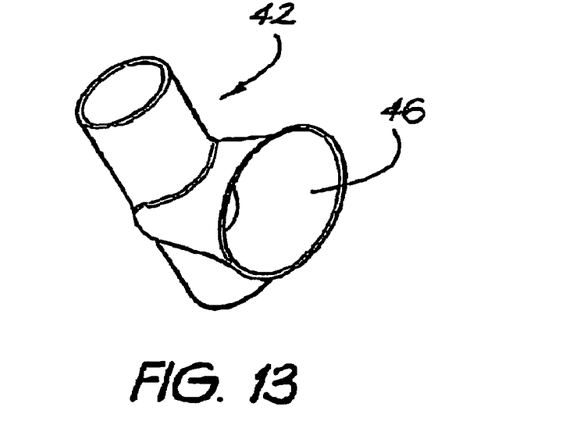
Figure 14:
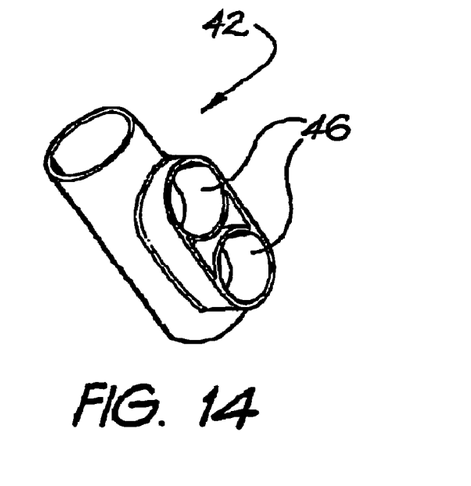
Figure 15:
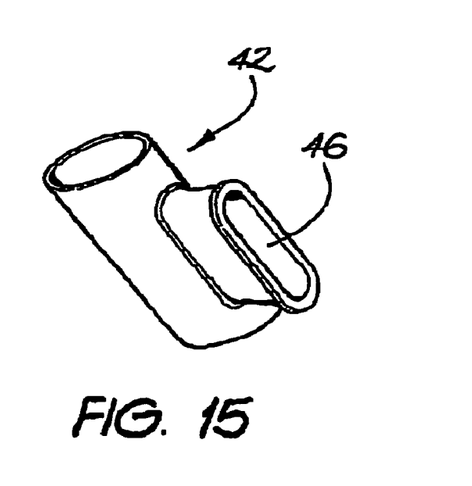
Figure 16:
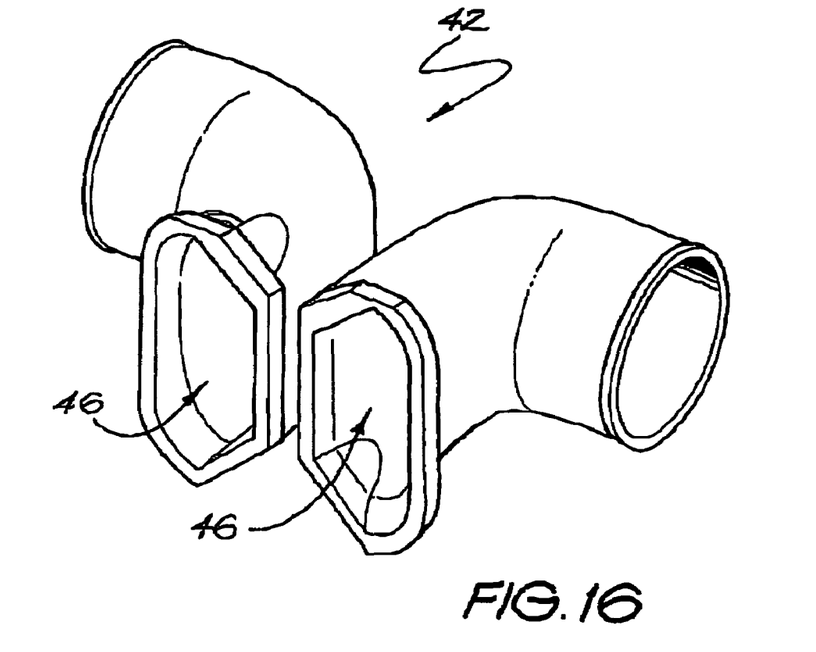

A flushing water manifold 40 is located beneath the rim 36 and is in fluid communication with the flush pipe 30. The manifold 40 has a primary outlet nozzle arrangement 42 positioned near the frontward end 28*b* of the cistern 28 and a smaller secondary outlet nozzle arrangement, in the form of single nozzle 44, positioned adjacent the rearward end of the pan 28*a*. The primary outlet nozzle arrangement 42 has four outlet nozzles 46, which are best seen in FIG. 7. The manifold 40 also has a number of tertiary outlet nozzle arrangements, in the form of holes 48, disposed along the sides of the pan 28.

In the preferred embodiment shown, the manifold 40 is a separate, substantially oval shaped plastic component that substantially replicates the shape of the pan rim 36. In other embodiments (not shown), the manifold is formed integrally with the pan or with the toilet seat.

The pan 28 also includes a flushing outlet 50 which is connected to a mains sewerage system in a known manner. The flushing outlet 50 is preceded by an S-bend outlet trap 51 formed from a first downwardly convex lower bend 52 and a second upwardly convex upper bend 54. The pan 28 also has a rear wall 56 which is upwardly angled from the rear of the pan 28 at about 10° from horizontal. The front wall 58 of the pan 28 has an upper relatively steeply angled portion 58*a*, lower relatively steeply angled portion 58*b*, which is substantially parallel to and rearwardly displaced from the upper portion 58*a*, and an intermediate relatively shallowly angled portion 58*c* therebetween. The portion of the pan 28 adjacent the lower front wall portion 58*b* is substantially cylindrical and has a central longitudinal axis 60.

The operation of the suite 20 will now be described. Pressing one of the actuator buttons 24 initiates flushing of the suite 20. The flushing water is communicated from the cistern 22 to the flush pipe 30 and so to the flushing water manifold 40. The majority of the flushing water (approximately 80%) exits the manifold 40 via the four nozzles 46 in the primary outlet arrangement 42, as indicated by the large arrow 62 and is directed towards the commencement of the S-bend outlet trap 51 in a direction substantially parallel with the axis 60 of the cylindrical portion of the pan 28 adjacent the front wall lower portion 58*b*. Directing the flushing water 62 in this way concentrates the energy of the flushing water into the outlet trap 51 and results in adequate clearing of waste (equal to or better than current standards for known 6/3 liter full/reduced flush toilet suites) within the pan 28 with the 3/2 liter ultra-low flushing volumes. A minority of the flushing water is directed through the outlet 44, as indicated by medium arrow 64, to wet and clean the rear wall 56 of the pan. An even smaller amount of the flushing water is directed out of the holes 48 as indicated by small arrows 66 to wet and clean the sides of the pan 28.

The water level in the pan 28 in the absence of a flush is denoted 68 in FIG. 1. During the previously described flushing action, the energy of the majority of the flushing water 62 creates a partial syphoning action within the outlet trap 51 which results in the water level during the flush falling to approximately that denoted 70. The surface area at the level 70 is approximately half that at the level 68 and the corresponding reduction in cross sectional area of the outlet trap 51 further increases the velocity, and thus concentrates the energy, of the flushing water through the trap 51, further aiding in waste clearance. The larger surface area at the water level 68 also advantageously provides a larger target area for user's wastes, particularly solid wastes. Further advantageously, the geometric centre of the surface area of the water at level 68 is substantially vertically aligned with the approximate solid waste drop position of a user.

Accordingly, before flushing, the pan 28 advantageously provides a large target surface area (at level 68) to minimise the likelihood of waste being incident on non wetted regions of the pan 28. During flushing, the pan 28 advantageously provides a reduced surface area (at level 70) to concentrate the energy of the flushing water. This combination also contributes to the improved clearing of waste in the pan 28 with ultra-low flushing volumes.

Figure 4:
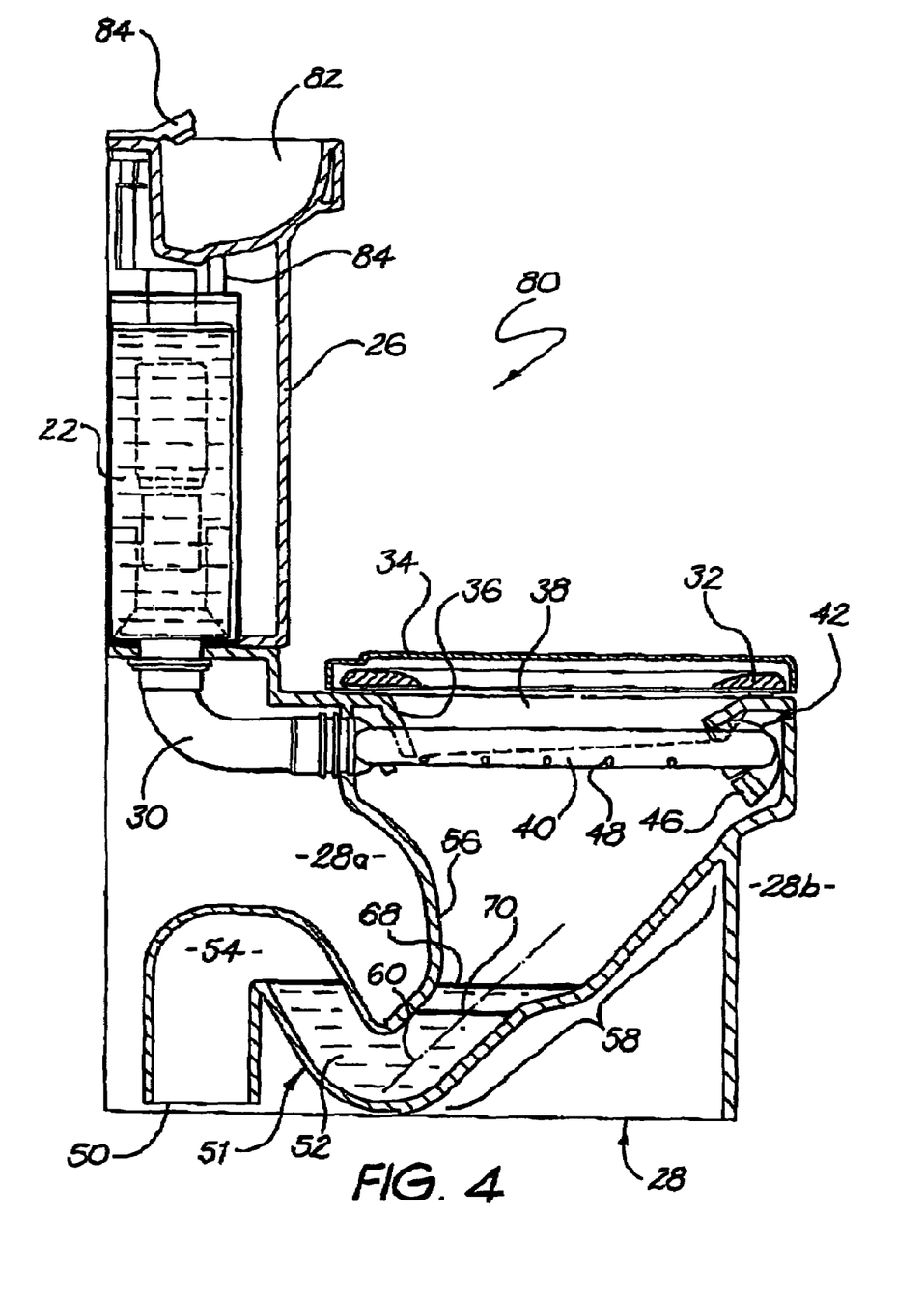
FIG. 4 is a cross sectional side view of a second embodiment of a toilet suite incorporating aspects of the invention.
Figure 5:
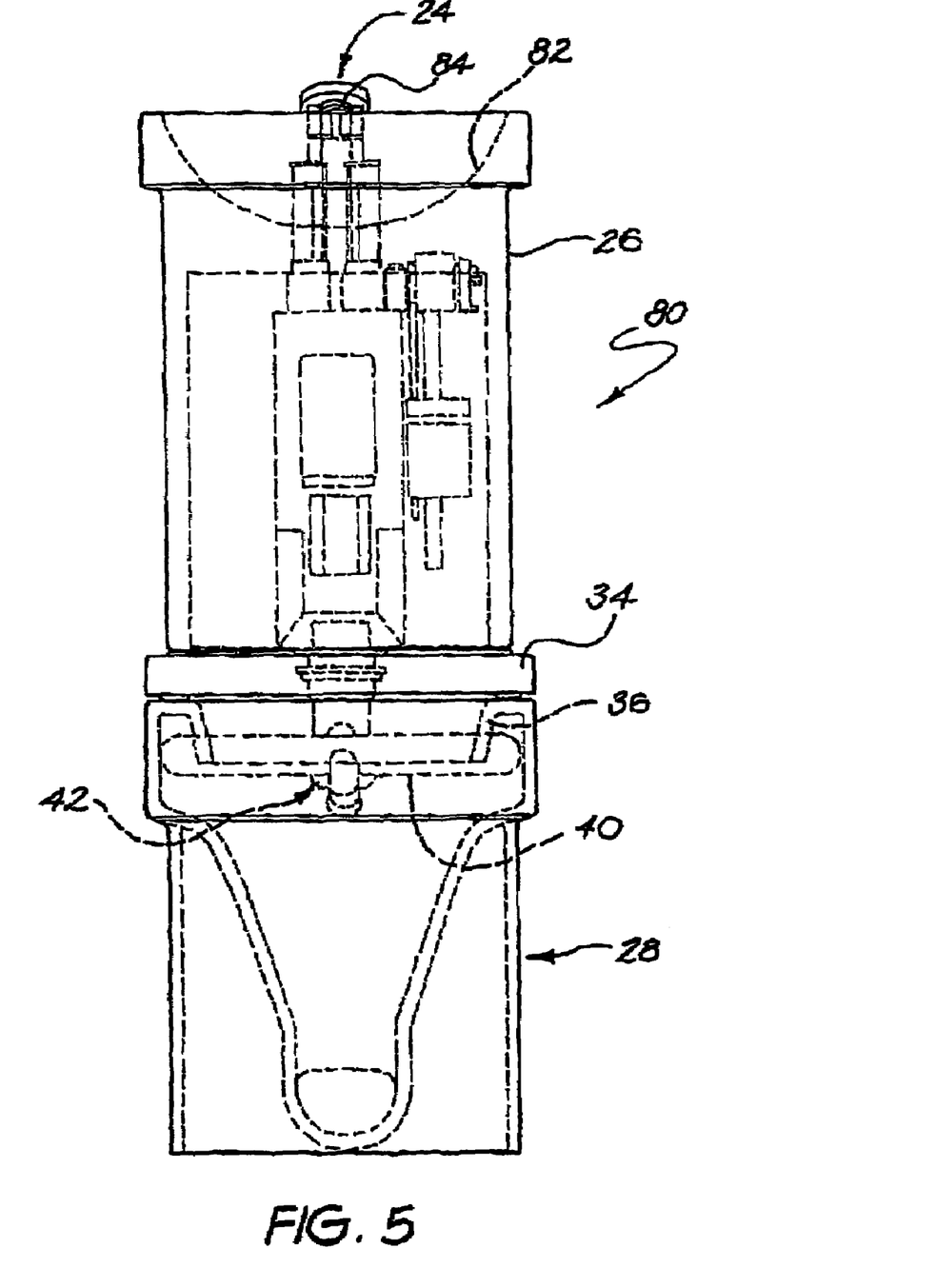
FIG. 5 is a front view of the suit shown in FIG. 4.
Figure 6:
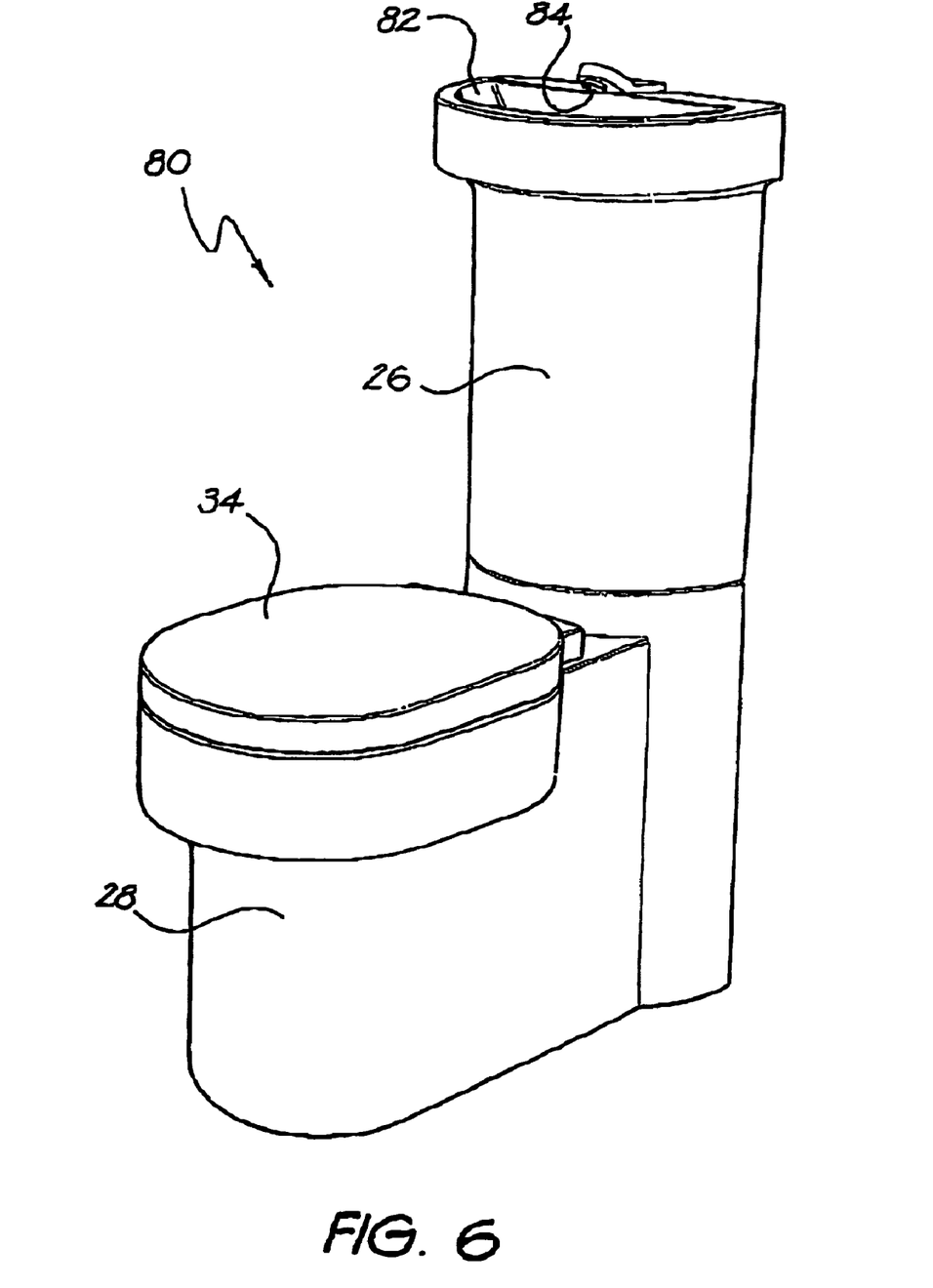
FIG. 6 is a perspective view of the suit shown in FIG. 4.

FIGS. 4 to 6 show a second embodiment of suite 80 incorporating aspects of the invention which is similar to the suite 20 described with reference to FIGS. 1 to 3 and in which like reference numerals are used to indicate like features. The difference between the suite 80 and 20 is the suite 80 has a hand washing basin 82 integrally formed with the cistern body 26. After flushing, the mains water used to fill the cistern 22 is directed to a free outlet tap 84 whereafter it flows from the basin 82 through a pipe 84 and into the cistern 22. This arrangement provides further reductions in overall water usage by allowing a user to wash their hands with water that is then reused as flushing water rather than washing their hands in water that is directly returned to the sewer.

FIG. 7 is an enlarged detailed view of the preferred form of primary outlet nozzle arrangement 42. FIGS. 8 through 17 are similar views of other primary outlet nozzle arrangements 42 with outlet nozzles 46.

Figure 17:
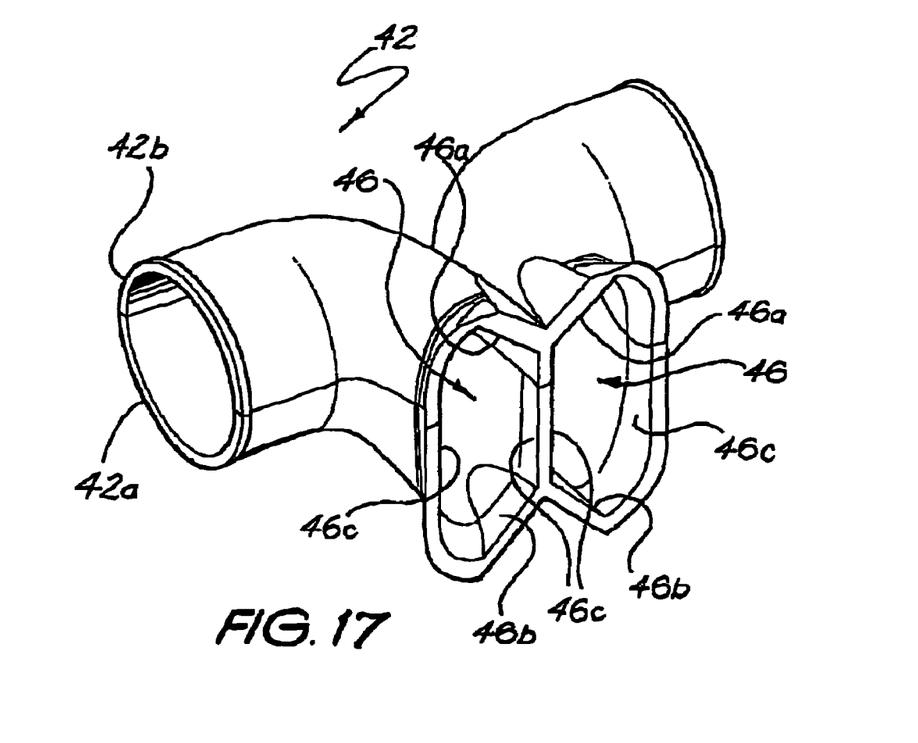

The primary outlet nozzle arrangement 42 shown in FIG. 17 is the most preferred and is formed from upper and lower moulded halves 42a and 42b respectively. The outlets 46 each receive a separate portion of the flushing water from either side of the manifold 40. This reduces the turbulence, and energy loss, of the two streams of water hitting each other during entry to the primary outlet nozzle arrangement 42, compared to earlier embodiments shown in FIGS. 7 to 15. Further, the outlets 46 include upper, lower and side edges 46a, 46b and 46e respectively which are shaped to form the flow of flushing water (as exemplified by the arrow 62 in FIG. 1) into a cross sectional shape similar to that of the surface of the water in the pan 28 at level 68. Directing and shaping the flushing water 62 to cover all of the water surface at level 68 serves to maximise the amount of waste that is directed into the waste S-bend outlet trap 51 and out through the flushing outlet 50. Concentrating and directing the energy of the flushing water 62 into the trap 51 in this way improves waste clearance.

Figure 18:
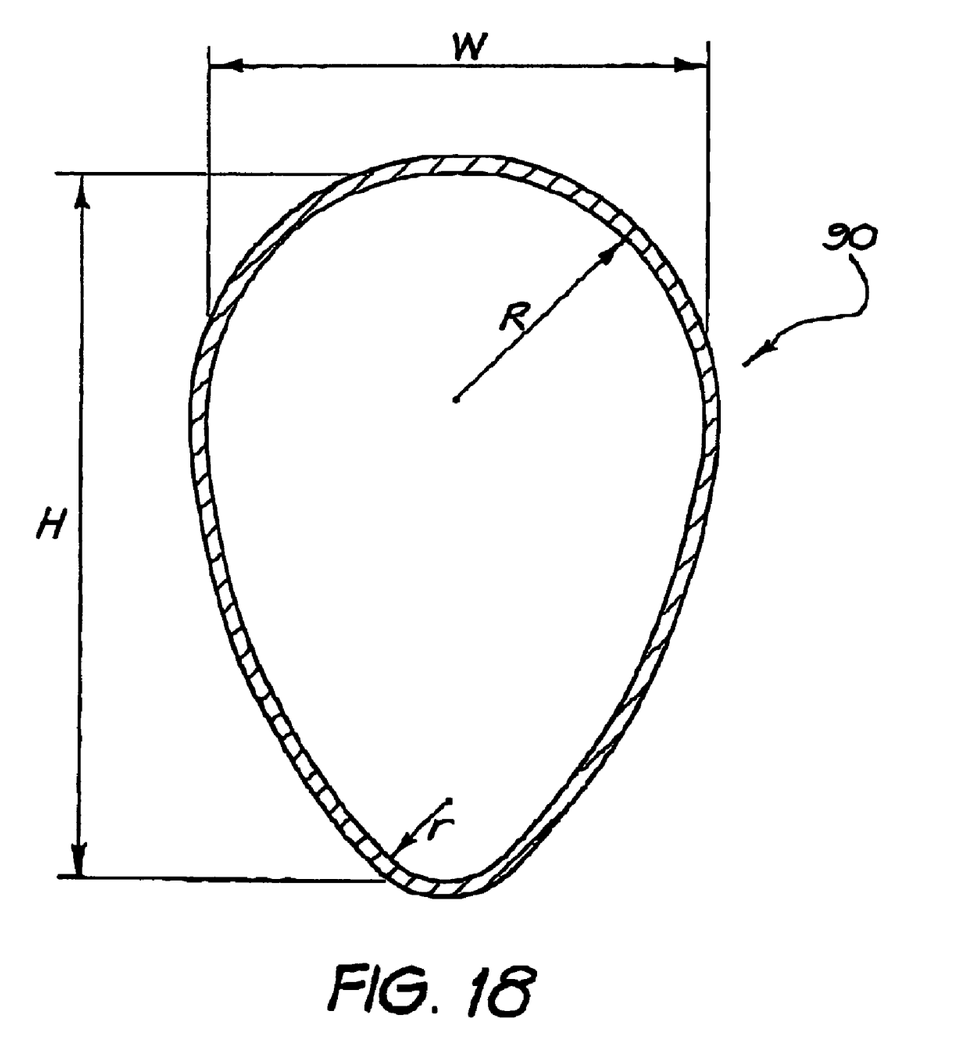
FIG. 18 is an end view of an embodiment of a drainline incorporating an aspect of the invention.

FIG. 18 is an end view of a drainline 90 suitable for use with the ultra-low flushing volume toilet suites described above. The drainline 90 is characterised by an internal height H to width W ratio between about 1.4:1 and 1.5:1 and an internal upper radius R to lower radius r ratio of about 3:1. It has been found that these ratios provide a drainline with an optimum balance between waste transportation at low flow rates (less than 2.5 liters/second) due to increased flow velocity in the lower (and slimmer) portion of the drainline 90 and total capacity at high flow rates. The preferred size of the drainline 90 is an internal height H of 130 mm, internal width W of 90 mm, upper internal radius R of 45 mm and lower internal radius r of 15 mm.

When the suites 20 and 80 were matched with the drainline 90, and their performance benchmarked against an industry leading 6/3 liter dual flush toilet suite, the following results were obtained from a comparison of potable water usage and savings for the suites 20, 80 and the 6/3 liter dual flush WC based on daily water usage per person of five flush cycles (one full flush and four reduced flush cycles).

| WC system | Daily water usage per person | Average flush volume | Percentage saving |
|---|---|---|---|
| 6/3 liter dual flush (benchmark) | 18 liters | 3.6 liters | — |
| Suite 20 | 11 liters | 2.2 liters | 39% |
| Suite 80 | 9.38 liters | 1.88 liters | 48% |

Although the invention has been described with reference to preferred embodiments, it will be appreciated by those skilled in the art that the invention is not restricted to such preferred embodiments. For example, the invention is also suitable for use with pans that have a P-bend outlet trap.

The invention claimed is:

1. A toilet pan for an ultra-low flushing volume toilet, the pan comprising:
    a flushing outlet;
    an outlet trap in fluid communication with the flushing outlet, the outlet trap comprising a first downwardly convex lower bend and a second upwardly convex upper bend;
    a front pan wall comprising:
        a front upper portion being relatively steeply angled;
        a front lower portion substantially parallel to and displaced rearwardly from the upper portion; and
        an intermediate portion arranged between the upper and lower portions and being relatively shallowly angled; and
    a rear pan wall comprising:
        a rear upper portion; and
        a rear lower portion having an upper end and a lower end, the upper end located at an intersection between the rear lower portion and the rear upper portion, the rear lower portion being substantially parallel to the front lower portion,
        wherein the front lower portion and the rear lower portion together define a passage of substantially constant cross-sectional area extending from the upper end of the rear lower portion to the lower end of the rear lower portion,
        and wherein a first cross-sectional area of the pan at an upper level horizontally aligned with the upper end of the rear lower portion is larger than a second cross-sectional area of the pan at a lower level horizontally aligned with the lower end of the rear lower portion, the intermediate portion being arranged between the first and second cross-sectional areas.

2. The pan as claimed in claim 1, wherein the first cross-sectional area is approximately double the size of the second cross-sectional area.

3. The pan as claimed in claim 1, wherein the pan has a substantially vertical rear wall section with a lower edge substantially adjacent the first cross-sectional area.

4. The pan as claimed in claim 3, wherein the rear wall is upwardly angled from the rear of the pan at about 0 to 10 degrees from horizontal.

5. The pan as claimed in claim 1, wherein the geometric centre of the first cross-sectional area is substantially horizontally aligned with a user's solid drop position.

6. The pan as claimed in claim 1, wherein the second cross-sectional area is rearward of the solid drop position.

* * * * *

UNITED STATES PATENT AND TRADEMARK OFFICE
CERTIFICATE OF CORRECTION

PATENT NO. : 7,640,604 B2
APPLICATION NO. : 10/486566
DATED : January 5, 2010
INVENTOR(S) : Stephen John Cummings It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this

Sixteenth Day of November, 2010

David J. Kappos
*Director of the United States Patent and Trademark Office*